(12) United States Patent
Wagener

(10) Patent No.: US 6,310,550 B1
(45) Date of Patent: *Oct. 30, 2001

(54) SECURITY SYSTEM

(75) Inventor: Carl S. Wagener, Parkmore (ZA)

(73) Assignee: Fred N. Gratzon, Fairfield, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,250

(22) Filed: Jun. 7, 2000

Related U.S. Application Data

(60) Continuation of application No. 09/376,767, filed on Aug. 17, 1999, now Pat. No. 6,111,505, which is a division of application No. 08/674,624, filed on Jul. 3, 1996, now abandoned.

(51) Int. Cl.[7] .................................................. G08B 13/14
(52) U.S. Cl. ...................... 340/568; 340/571; 340/686.1; 340/649; 340/573; 340/691; 340/546
(58) Field of Search ................................ 340/568.1, 571, 340/686.1, 649, 573, 691, 546

(56) References Cited

U.S. PATENT DOCUMENTS

| | | | |
|---|---|---|---|
| 3,611,333 | 10/1971 | Conigliaro et al. | 340/568 |
| 4,242,670 | 12/1980 | Smith | 340/568 |
| 4,494,114 | 1/1985 | Kaish | 340/825 |
| 4,617,556 | 10/1986 | Rivera et al. | 340/546 |
| 4,736,195 | 4/1988 | McMurtry et al. | 340/568 |
| 4,797,663 | 1/1989 | Rios | 340/691 |
| 4,812,810 | 3/1989 | Query et al. | 340/545 |
| 4,985,695 * | 1/1991 | Wilkinson et al. | 340/571 |
| 4,999,621 | 3/1991 | Loeb | 340/571 |
| 5,003,292 | 3/1991 | Harding et al. | 340/568 |
| 5,281,952 | 1/1994 | Dragan | 340/546 |
| 5,317,304 | 5/1994 | Choi | 340/571 |
| 5,479,341 | 12/1995 | Pihl et al. | 340/542 |
| 5,578,991 | 11/1996 | Scholder | 340/571 |
| 5,675,321 | 10/1997 | McBride | 340/568 |
| 5,677,850 | 10/1997 | Ott | 364/508 |
| 5,748,083 * | 5/1998 | Rietkerk | 340/568 |
| 5,757,271 | 5/1998 | Andrews | 340/539 |
| 5,774,053 | 6/1998 | Porter | 340/568 |
| 5,802,280 | 9/1998 | Cotichini et al. | 340/571 |
| 5,818,336 | 10/1998 | Varga et al. | 340/545 |
| 5,821,868 * | 10/1998 | Kuhling | 340/649 |
| 5,841,352 | 11/1998 | Prakash | 340/573 |
| 5,926,091 | 7/1999 | Svensson et al. | 340/568.2 |
| 5,926,092 | 7/1999 | Kim | 340/571 |
| 5,936,523 | 8/1999 | West | 340/545.6 |
| 5,945,915 | 8/1999 | Cromer et al. | 340/686.1 |
| 5,963,131 | 10/1999 | D'Angelo et al. | 340/568.1 |
| 6,111,505 * | 8/2000 | Wagener | 340/586.1 |

* cited by examiner

Primary Examiner—Daniel J. Wu
Assistant Examiner—Tai T. Nguyen
(74) Attorney, Agent, or Firm—Dunlap, Codding & Rogers, P.C.

(57) ABSTRACT

The present invention is a method for monitoring equipment. A computer having an enclosure defining an enclosure space is initially provided. Disposed within the enclosure space is a central processing unit including a memory and an arithmetic logic unit. The computer is provided with communication means operably connected to the central processing unit for permitting communication between the central processing unit and a peripheral device. An alarm sensor is disposed within the enclosure space of the computer. When the alarm sensor senses an alarm condition, the security system outputs a data signal indicative of the alarm condition for sounding an alarm, for example.

23 Claims, 5 Drawing Sheets

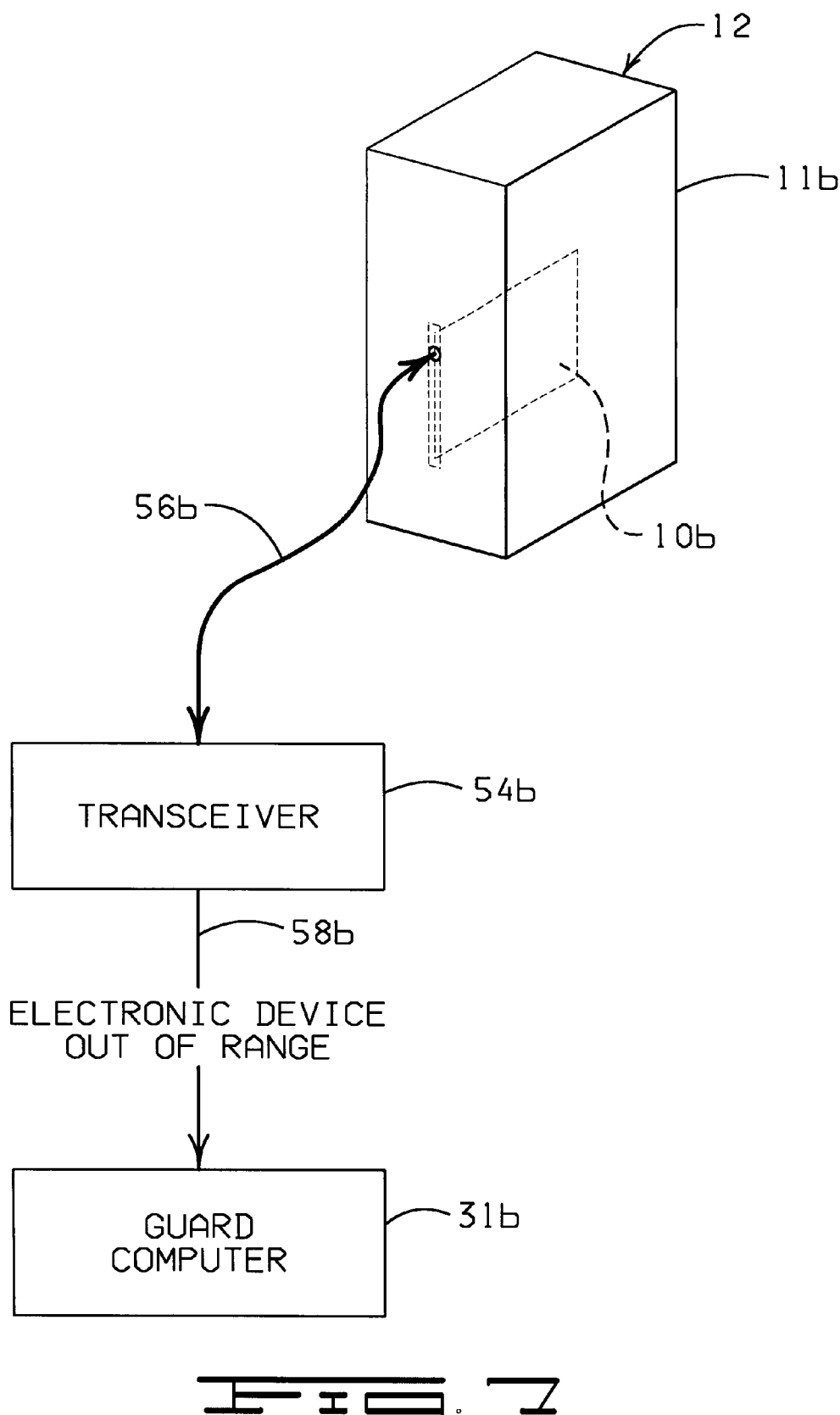

SECURITY SYSTEM

This is a continuation of Ser. No. 09/376,767 now U.S. Pat. No. 6,111,505 entitiled SECURITY SYSTEM which was filed on Aug. 17, 1999, and which is hereby expressly incorporated herein by reference, which is a divisional application of U.S. Ser. No. 08/674,624, entitled SECURITY SYSTEM which was filed on Jul. 3, 1996 now abandoned.

FIELD OF THE INVENTION

The present invention relates generally to security systems, and more particularly, but not by way of limitation, to security systems which detect:

a) the opening of an enclosure of an electronic device;

b) the disconnection of a peripheral device from the electronic device;

c) the disconnecting of the electronic device from a power source; or d) the removal of the electronic device from a network security loop or predefined location.

BACKGROUND

Household and office security systems are well known in the art. Typically such systems provide sensors which communicate with a controller. The sensors are typically infrared sensors keyed by body heat, sound sensors keyed by noise, or pressure and magnetic sensors keyed by the opening of doors and windows for sensing the presence of intruders. An alarm condition is declared by the controller when one of the sensors sends the controller a signal indicative of the alarm condition. In response to receiving such signal, the controller sets a local alarm to scare off the intruder and/or transmits an alarm signal to a subscriber company which watches for such alarm conditions.

Although these alarm systems are well known, the theft of components or exchange of components of electronic equipment is a commonplace problem. These prior art alarm systems are ineffective to stop the theft or exchange of electronic equipment because the intruder is typically authorized to be in the office or in the home. In other words, the intruder is authorized to be in the office or in the home but is unauthorized to be removing or exchanging components of electronic equipment.

In view of the foregoing, there is a need for a security system that can detect the unauthorized removal or exchange of components of electronic equipment. It is to such a security system that the present invention is directed.

BRIEF DESCRIPTION OF THE DRAWINGS

FIG. 7 is a schematic, diagrammatic view of another embodiment of a security system constructed in accordance with the present invention.

DETAILED DESCRIPTION

Definitions

Computer System and Computer

The terms "computer system" and "computer" as used herein mean a system or systems which are able to embody and/or execute the logic of the processes described herein. The logic embodied in the form of software instructions or firmware may be executed on any appropriate hardware which can be a dedicated computer system or systems, or a general purpose computer system, or a distributed processing computer system. All of these computer systems are well understood in the art. Thus, a detailed description of how to make or use such computer systems is not deemed necessary herein.

Communication Link

The term "communication link" refers to any suitable communication link which permits electronic communication. That is, the term "communication link" is intended to refer to any suitable communication system, including extra-computer communication systems and intra-computer communication systems. Examples of such communication systems include, but are not limited to internal computer buses, local area networks, wide area networks, point-to-point shared and dedicated communication links, infra-red links, microwave links, telephone links, CATV links, satellite links, radio links, ultra-sonic links, and fibre-optic links.

Electronic Device or Electronic Equipment

The terms "electronic device" or "electronic equipment" refer to devices constructed of circuits or systems developed through electronics. Typically, the terms "electronic device" or "electronic equipment" refer to devices which pertain to or are controlled by computers or computer products and services. For example, the terms "electronic device" or "electronic equipment" may refer to computers, computer systems, printers, monitors, stereos, clocks, televisions, and the like.

Components or Peripherals

The terms "components" or "peripherals" refer to electronic apparatus which are operably connected to form an electronic device or electronic equipment. For example, if the electronic device is a personal computer, the components or peripherals would be the personal computer's motherboard, video boards, monitor, hard disk, floppy disk, memory, printer, communication board, and the like.

Enclosure

The term "enclosure" refers to a case or container of the electronic device or electronic equipment which contains or substantially encompasses some of the components or peripherals of the electronic device or electronic equipment. For example, assume that the electronic device is a personal computer system. The personal computer system can be provided with a rectangular case which is sometimes referred to as a tower case (enclosure) and which contains the personal computer's motherboard, hard drives, floppy drives, video boards (components or peripherals). The tower case would be the "enclosure" referred to herein and the motherboard and the like would be the "components" or "peripherals".

Figure 1:
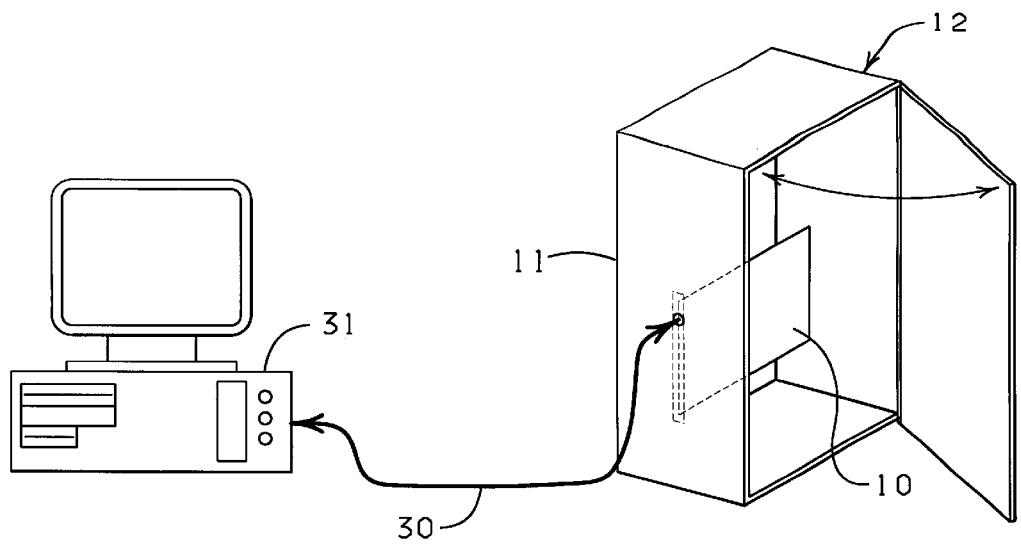
FIG. 1 is a perspective, diagrammatic view of a security system operating in accordance with the present invention.
Figure 2:
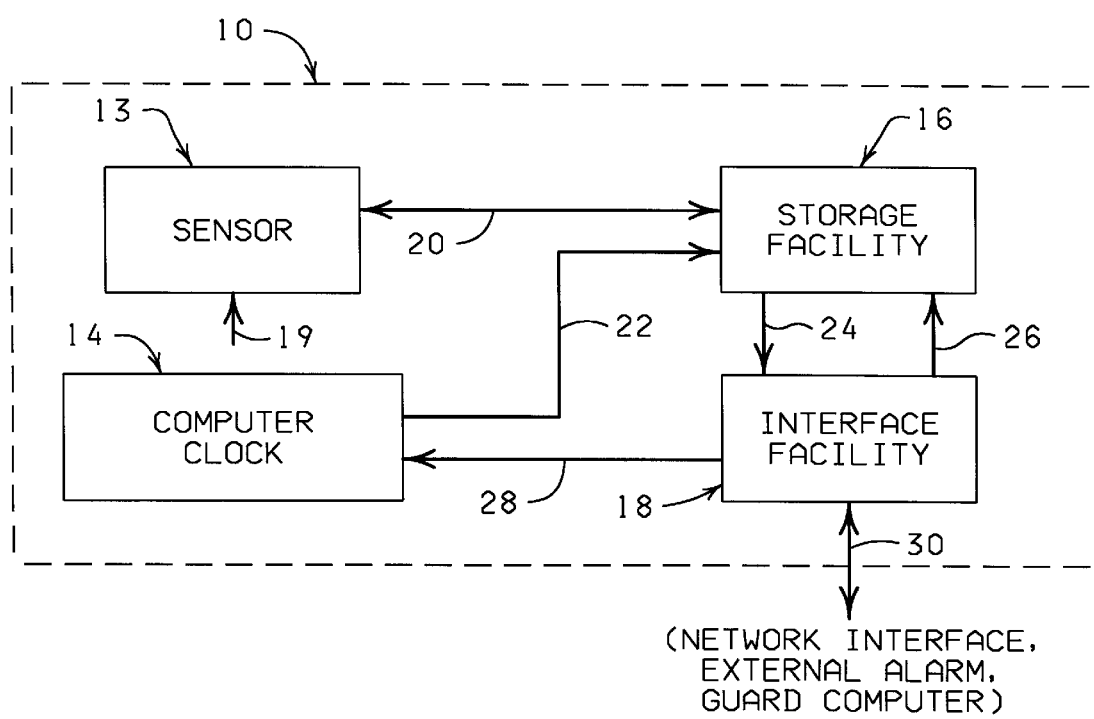
FIG. 2 is a schematic, diagrammatic view of the security system of FIG. 1.
Figure 3:
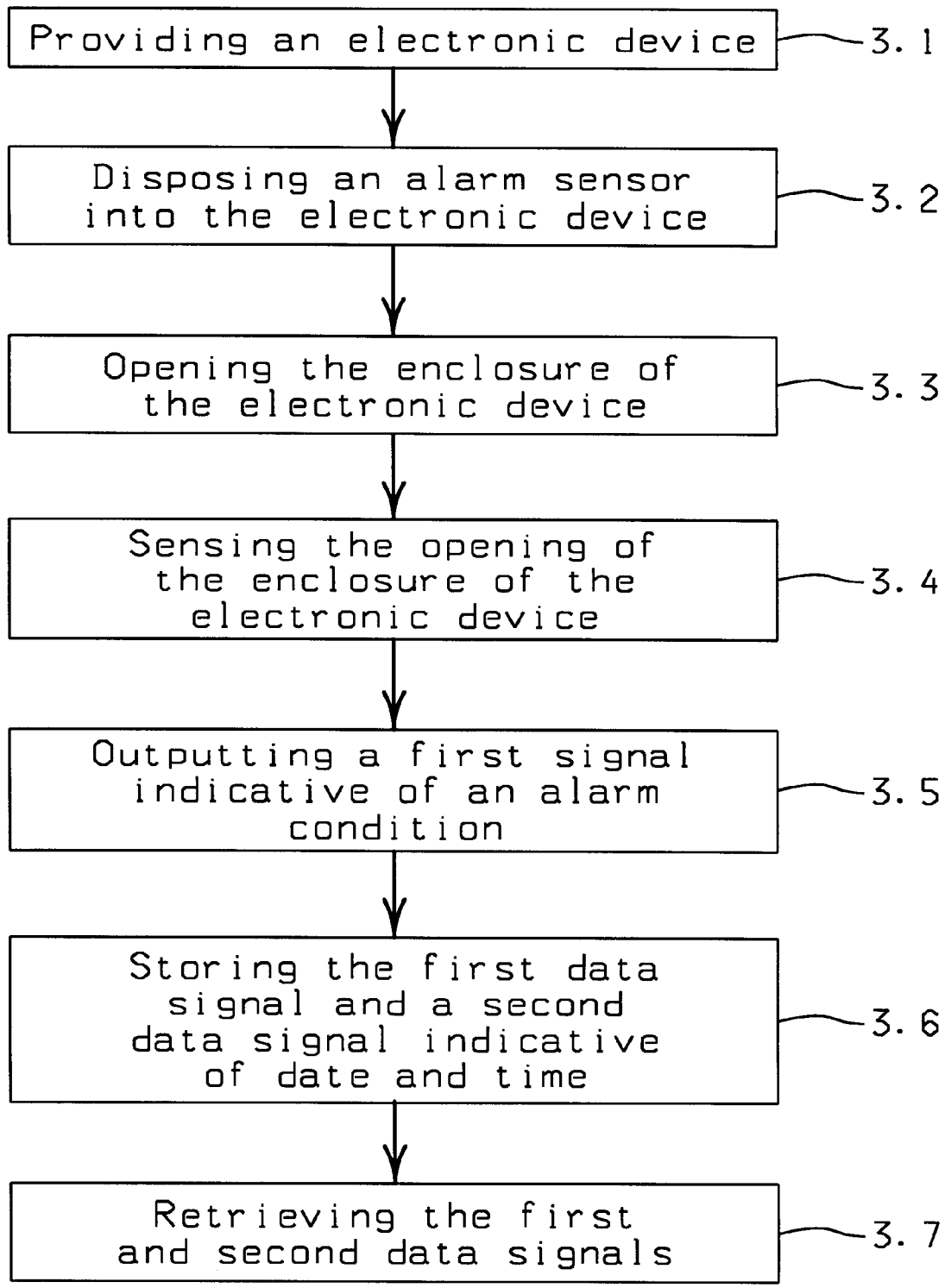
FIG. 3 is a diagrammatic view of a sequence of steps followed by one embodiment of the present invention of FIG. 1.

Description of Process (Referring to FIGS. 1, 2 and 3)

Illustrated in FIG. 1 is a security system 10 for monitoring the unauthorized removal and/or exchange of components operably connected to a protected electronic device 12. The security system 10 is disposed within an enclosure space defined by an enclosure 11 of the protected electronic device 12. It should be noted that the security system 10 may also be connected to a portion of the enclosure 11.

For example, the protected electronic device 12 could be a general purpose personal computer system, which is provided with a keyboard and a monitor in a manner well known in the art. The personal computer system can be provided with a rectangular case or enclosure (the enclosure 11) which is sometimes referred to as a tower case, for example, and which contains the personal computer system's motherboard, hard drives, floppy drives, video boards and expansion ports. Typically, the personal computer system's monitor, keyboard, and printer plug into ports provided on the case. The term "enclosure" of the "electronic device" as recited herein, is intended in this example to refer to the case or enclosure containing the computer system's motherboard and the like. The terms "components" or "peripherals" as used herein are intended to refer to the personal computer system's keyboard, monitor, video board, memory and the like which are operably connected to form the computer system.

A portion of the enclosure 11 of the protected electronic device 12 is selectively movable between an open condition to allow access to the enclosure space and a closed condition to prohibit access to the enclosure space as indicated by an arrow 15 in FIG. 1. A central processing unit (not shown) is disposed within the enclosure space of the protected electronic device 12. The central processing unit is provided with a memory and an arithmetic logic unit in a manner well known in the art. The central processing unit is operably connected to a communication means (not shown) which permits communication between the central processing unit and both external and internal peripherals or components in a manner well known in the art. The communication means could be the motherboard or data buses of the protected electronic device 12. It should be noted that portions of the communication means can also be connected to the enclosure to provide input and output ports in a manner well known in the art.

As shown in more detail in FIG. 2, the security system 10 comprises an alarm sensor 13, a computer clock 14, a storage facility 16, and an interface facility 18. The alarm sensor 13 is disposed within the enclosure space of the protected electronic device 12 and senses or detects the occurrence of an alarm condition via an input 19. The alarm condition is typically the moving of the portion of the enclosure 11 from the closed condition to the open condition or the removal or disconnection of an internally disposed or externally disposed component from the protected electronic device 12. However, it should be understood that the alarm sensor 13 can monitor other aspects of the protected electronic device 12 in which it is installed, such as temperature, voltage, diagnostic ports, and/or the disconnection of the electronic device 12 from a network security loop or a power source. When an alarm condition is detected, the alarm sensor 13 transmits a data signal indicative of the alarm condition and of the cause of the alarm condition to the storage facility 16 via a communication link 20.

The alarm sensor 13 can be any sensor capable of detecting the occurrence of an alarm condition, such as the opening of the enclosure 11, or the removal and/or disconnection of a component. Typically, the alarm sensor 13 is an optical sensor, such as a photoelectric cell, which detects the ingress of light into the enclosure space when the portion of the enclosure 11 is moved from the closed condition to the open condition. However, the alarm sensor 13 can be a pressure sensor connected to the enclosure 11 such that the opening and closing of the enclosure 11 is detected, and/or the alarm sensor 13 can be software which communicates with the operating system of the protected electronic device 12 via the input 19 to detect the removal or disconnection of a component.

The computer clock 14 generates a data signal indicative of the date and time and transmits such data signal to the storage facility 16 via the communication link 22. The computer clock 14 can be any device which generates a data signal indicative of the date and time, such as the computer clocks provided as standard equipment on computer systems. Computer clocks, such as the computer clock 14 are well known in the art. Thus, no further description is deemed necessary to teach one skilled in the art to make or use the computer clock 14.

The storage facility 16 can be any storage facility capable of storing data signals, such as the data signals transmitted by the alarm sensor 13 and the computer clock 14. Typically, the storage facility 16 includes a non-volatile storage, such as a hard-disk, floppy disk, EEPROM or the like so that the data signals will not be erased by events such as power failures. However, it should be understood that the storage facility 16 can include volatile storage, such as RAM, which is connected to a back-up power supply or the like.

The interface facility 18 can be any facility, such as the communication means of the protected electronic device 12, which can communicate with both external components (e.g. printers, monitors, other computer systems and/or the like) and/or internal components (e.g. network adapters, sound cards, video cards, hard drives and/or the like) of the protected electronic device 12.

The storage facility 16 outputs data signals to be received by the interface facility 18 via a communication link 24. Likewise, the interface facility 18 outputs data signals to be received by the storage facility 16 via a communication link 26 and by the computer clock 14 via a communication link 28. In addition, the interface facility 18 transmits and receives data signals via a communication link 30 to communicate alarm signals to alarms which emit auditory and/or visual indicators and which are disposed externally or internally of the enclosure of the computer system, or to notify a guard computer 31 (FIG. 1) of an alarm condition via SNMP or other appropriate technique to tell someone that the protected electronic device 12 has been tampered with and that they might need to monitor people leaving the building, for example. The interface facility 18 may also receive data signals via the communication link 30 to allow interrogation of the security system 10 by the guard computer 31 across a network interface or other compatible device.

It should be noted that although each of the alarm sensor 13, computer clock 14, storage facility 16 and interface facility 18 are shown in FIG. 1 as separate components, it should be understood that this is solely for clarity. That is, each of the alarm sensor 13, computer clock 14, storage facility 16 and interface facility 18 could be formed from single or multiple components, or could be integrally constructed within the protected electronic device 12 or could be software which will run on the protected electronic device 12 to achieve the operations described herein.

In addition, the security system 10 can be provided with a backup power supply, such as a battery, so that the security system 10 remains operational in the event of power failures, or in the event that the protected electronic device 12 is turned off or unplugged.

In one embodiment of the present invention, the electronic device 12 is provided, as indicated by block 3.1 (FIG. 3). The alarm sensor 13 is disposed within the enclosure space of the electronic device 12 and positioned such that the alarm sensor 13 can sense the ingress of light into the enclosure space, as indicated by the block 3.2 (FIG. 3). A portion of the enclosure 11 is then moved to the open position such that light can radiate into the enclosure space of the protected electronic device 12, as indicated by the block 3.3. The alarm sensor 13 automatically senses the opening of the enclosure 11, as indicated by the block 3.4. Alternatively, the alarm sensor 13 may sense some other alarm condition, for example, such as the disconnection of some other protected electronic device 12 from a power source or the breakage of a security loop connection. In response thereto, the alarm sensor 13 outputs a first data signal indicative of an alarm condition and of the cause of the alarm condition over the signal path 20 to be received by the storage facility 16, as indicated by the block 3.5

The storage facility 16 receives and automatically stores such first data signal and in response thereto automatically transmits a data signal to the interface utility 18 via the communication link 24. In response to receiving the data signal output by the storage facility 16, the interface facility 18 automatically outputs a data signal via the communication link 28 to be received by the computer clock 14 and another data signal over the communication link 30 to be received by an external alarm or network interface. In response thereto, the computer clock 14 automatically outputs a second data signal indicative of the date and time over the communication link 22 to be received by the storage facility 16. The storage facility 16 then automatically stores the second data signal, as indicated by the block 3.6.

Once the first and second data signals are stored, the interface facility 18 of the security system 10 may receive a data request signal requesting the first and second data signals via the communication link 30 or another communication link (not shown), as indicated by the block 3.7. Alternatively, the data request signal may be generated internally to the interface facility 18, so as to cause an asynchronous data transfer, as described below on depiction of an alarm condition. In response to receiving the data request signal, the interface facility 18 automatically transmits the data request signal to the storage facility 16 via the communication link 26. In response thereto, the storage facility 16 automatically transmits the first and second data signals to the interface facility 18 via the communication link 24. The interface facility 18 receives the first and second data signals and then automatically transmits such first and second data signals via the communication link 30 to be received by an entity such as the guard computer 31.

In summary, the security system 10 is designed to detect an alarm condition, such as the opening of the enclosure 11 of the protected electronic device 12, or the disconnection of the protected electronic device 12 from a power source or the breakage or interruption of the protected electronic device 12 from a security loop connection, and to store the date and time coincident of the alarm condition and the cause of the alarm condition so that the date and time of the occurrence of the alarm condition and the cause of the alarm condition can be provided to security personnel for determining the identity of the person responsible for the removal and/or exchange of components.

Figure 4:
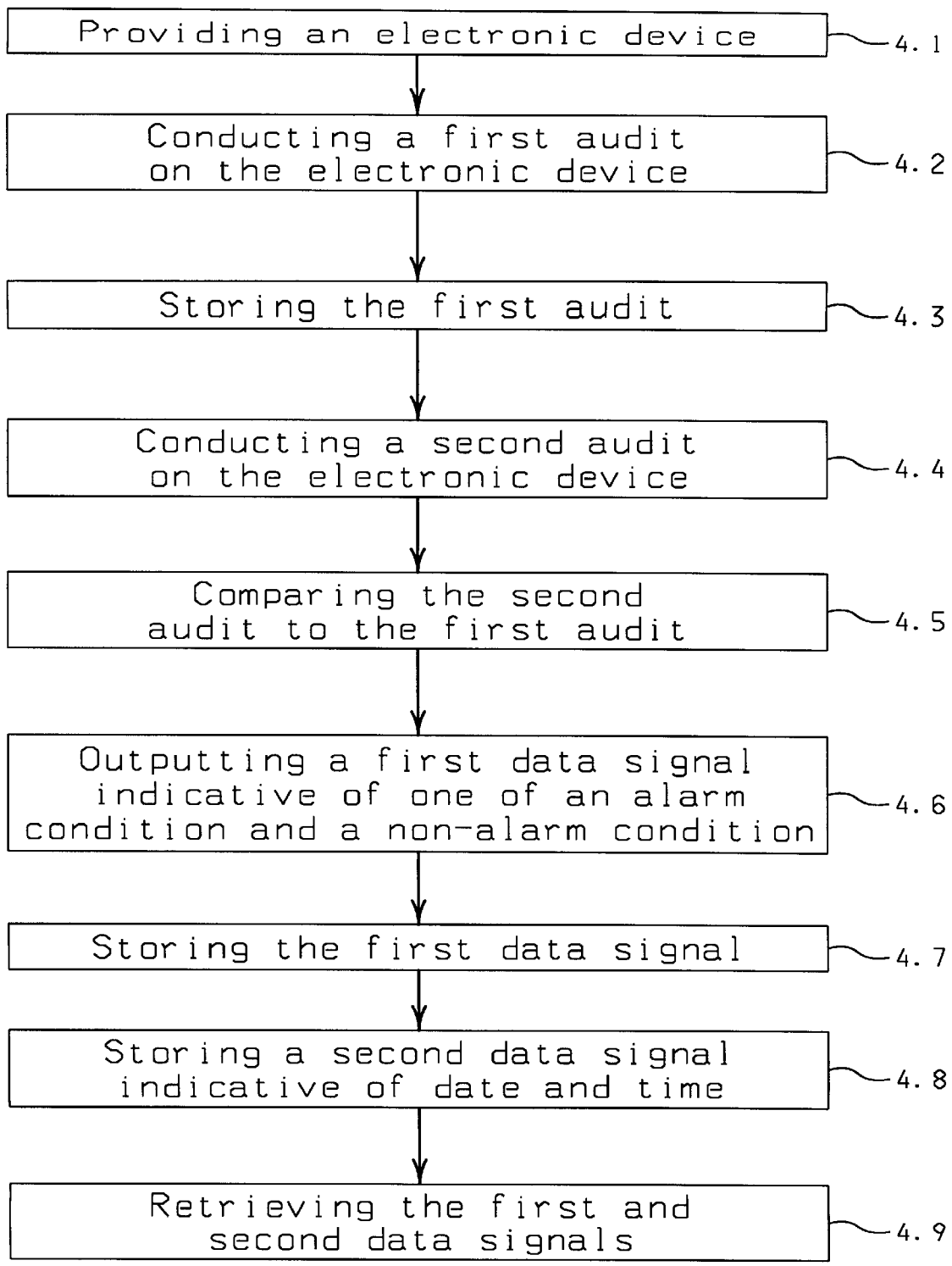
FIG. 4 is a diagrammatic view of a sequence of steps followed by another embodiment of the present invention of FIG. 1.

Description of Process (Referring to FIGS. 2 and 4)

Shown in FIG. 4 is a diagrammatic view of a sequence of steps followed by another embodiment of the present invention of FIG. 2. In this embodiment, the protected electronic device 12 is provided as indicated by block 4.1. The alarm sensor 13 is disposed in the enclosure space of the protected electronic device 12. However, the alarm sensor 13 is not a physical alarm sensor, but is a computer program which is programmed into the protected electronic device 12 in such a manner that the program acts as the alarm sensor 13 to determine the removal or exchange of components.

The alarm sensor 13 automatically or manually conducts a first audit on the protected electronic device 12 to determine a first list of peripherals which are operably connected to the communication means, as indicated by block 4.2. The alarm sensor 13 then automatically outputs the first list to the storage facility 16 via the communication link 20. In response thereto, the storage facility 16 stores the first list of peripherals determined by the first audit, as indicated by the block 4.3.

Subsequently, the alarm sensor 13 automatically or manually conducts a second audit on the protected electronic device 12 to determine a second list of peripherals which are operably connected to the communication means, as indicated by the block 4.4. The second list of peripherals is then automatically or manually compared to the first list of peripherals by the alarm sensor 13, as indicated by the block 4.5. A first data signal indicative of one of an alarm condition and a non-alarm condition is automatically output to the storage facility 16 by the alarm sensor 13 via the communication link 20, as indicated by the block 4.6. If the first list of peripherals is not identical to the second list of peripherals, the first data signal is indicative of an alarm condition. Otherwise, the first data signal is indicative of a non-alarm condition.

In response to receiving the first data signal, the storage facility 16 stores the first data signal, as indicated by the block 4.7. Then, the storage facility 16 automatically transmits a data signal to the interface utility 18 via the communication link 24. In response to receiving the data signal output by the storage facility 16, the interface facility 18 automatically outputs a data signal via the communication link 28 to be received by the computer clock 14 and another data signal via the communication link 30 to be received by an external alarm or guard computer. In response thereto, the computer clock 14 automatically outputs a second data signal indicative of the date and time via the communication link 22 to be received by the storage facility 16. The storage facility 16 then stores the second data signal, as indicated by block 4.8.

It should be noted that once the first and second data signals are stored, the interface facility 18 of the security system 10 may receive a data request signal requesting the first and second data signals via the communication link 30, as indicated by the block 4.9. In response to receiving the data request signal, the interface facility 18 automatically transmits the data request signal to the storage facility 16 via the communication link 26. In response thereto, the storage facility 16 automatically transmits the first and second data signals to the interface facility 18 via the communication link 24. The interface facility 18 receives the first and second data signals and then automatically transmits such first and second data signals via the communication link 30 to be received by the entity which requested such data signals.

An entity, such as a network server, the guard computer 31, or the operating system of the protected electronic device 12 upon power-up, may communicate with the security system 10 to initiate the first and second audits and thereby initiate the steps following therefrom. In this embodiment, a data signal requesting initiation of one of the first and second audits is transmitted to the security system 10 via the communication link 30. In response to receiving the data signal, the interface facility automatically forwards such data signal to the alarm sensor 13 via the communication links 26 and 20. Upon receiving the data signal requesting one of the first and second audits, the alarm sensor 13 initiates such audit and automatically initiates the steps following therefrom as described hereinbefore.

Figure 5:
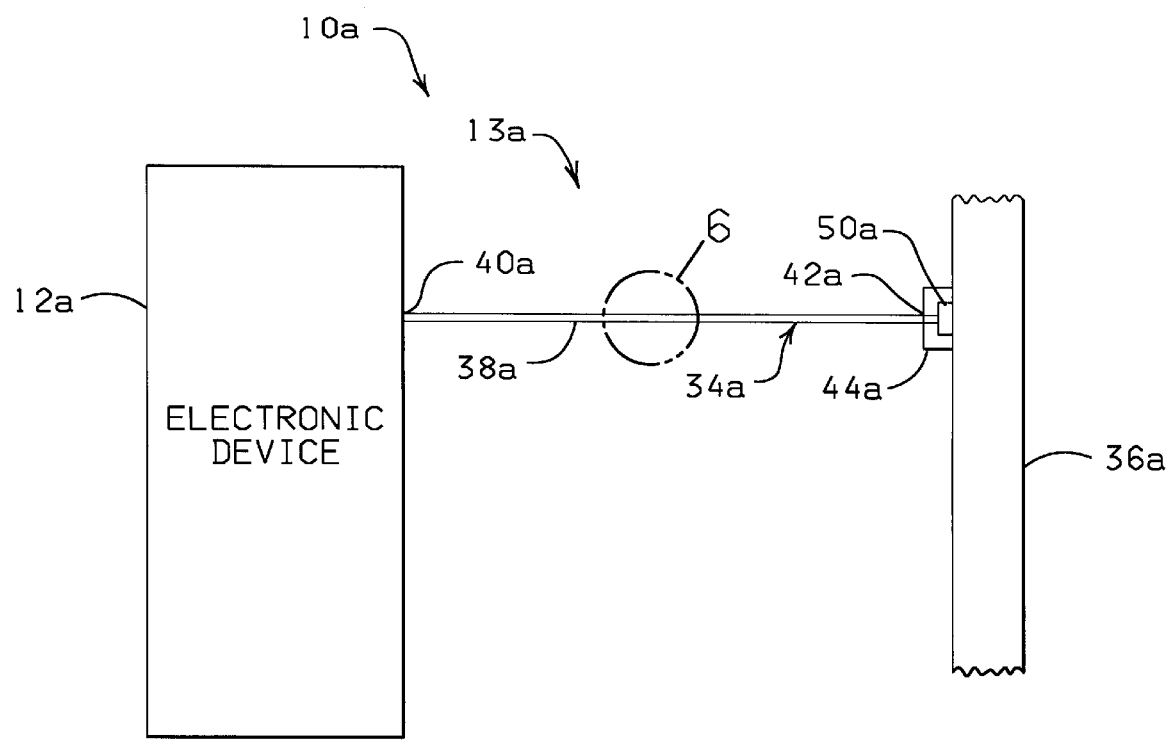
FIG. 5 is a partial, diagrammatic view of another embodiment of a security system constructed in accordance with the present invention.
Figure 6:
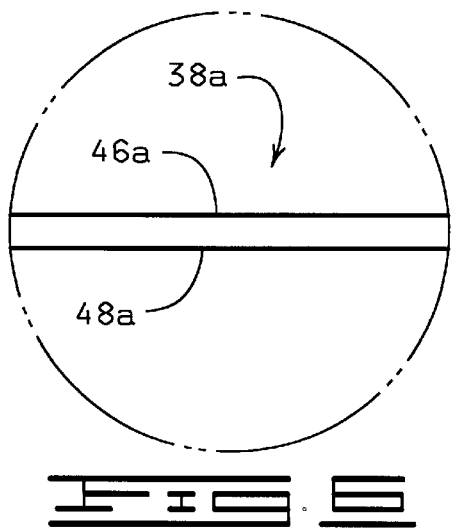
FIG. 6 is a partial, side elevational view of a cable, taken along the lines 6—6 of FIG. 5.

Description of FIGS. 5 and 6

Shown in FIG. 5 and designated by the general reference numeral 10a is another embodiment of a security system constructed in accordance with the present invention. The security system 10a is substantially similar in construction and function as the security system 10 shown and described in FIGS. 1 and 2 except as described hereinafter. The security system 10a is provided with an alarm sensor 13a forming a security loop 34a. The security loop 34a connects a protected electronic device 12a to an immovable object 36a, such as a desk or a wall, so as to maintain the protected electronic device 12a in a preselected location. Specifically, the alarm sensor 13a is adapted to detect the detachment of the protected electronic device 12a from the immovable object 36a so that the security system 10a outputs an alarm signal if the protected electronic device 12a is being stolen.

One embodiment of the security loop 34a of the alarm sensor 13a is shown in FIGS. 5 and 6. The security loop 34a is provided with a cable 38a having a first end 40a and a second end 42a. The first end 40a of the cable 38a is connected to the protected electronic device 12a and the second end 42a of the cable 38a is connected to a block 44a which is securely connected to the immovable object 36a. As shown in FIG. 6, the cable 38a is provided with a first conductor 46a and a second conductor 48a. Although the first and second conductors 46a and 48a, respectively, are shown as separate components it should be understood that this is solely for clarity in identifying the signals being transmitted between the block 44a and the protected electronic device 12a. Specifically, the first and second conductors 46a and 48a, respectively, could be constructed from single or multiple components in a manner well understood in the art.

In operation, the alarm sensor 13a outputs a first signal over the first conductor 46a. The first signal is received by the block 44a and in response thereto, the block 44a outputs a second signal over the second conductor 48a. The alarm sensor 13a then compares the first signal which was output over the first conductor 46a to the second signal which was output over the second conductor 48a and if the first and second signals match in a predetermined manner the alarm sensor 13a does not output a signal indicative of an alarm condition. However, if the first and second signals do not match in a predetermined manner due to the cutting of the cable 38a or the disconnection of the cable 38a from the block 44a or the protected electronic device 12a, for example, the alarm sensor 13a outputs a signal indicative of an alarm condition.

To detect the disconnection of the block 44a from the immovable object 36a, the block 44a is provided with a block sensor 50a disposed substantially adjacent the immovable object 36a. When the block 44a is removed from the immovable object 36a, the block sensor 50a outputs a signal indicative of an alarm condition to be received by the alarm sensor 13a so that the security system 10a can alert security personnel that the protected electronic device 12a is being stolen. The block sensor 50a is typically an optical sensor adapted to change the impedance of the security loop 34a in a preselected manner when the block 44a is disconnected from the immovable object 36a. However, it should be understood that the block sensor 50a can be any sensor capable of detecting the removal of the block 44a from the immovable object 36a.

Description of Process (FIGS. 2 and 7)

Shown in FIG. 7 is a diagrammatic view illustrating the operation of another embodiment of a security system 10b which is constructed in accordance with the present invention. The security system 10b operates in exactly the same manner as the security system 10 described herein in detail with reference to FIG. 2 except as described hereinafter. In this embodiment, an alarm sensor (not shown) of the security system 10b is disposed within an enclosure space defined by an enclosure 11b and/or the alarm sensor is connected to the enclosure 11b of a protected electronic device 12. The security system 10b is provided with a plurality of transceivers 54b, only one of the transceivers is shown in FIG. 7 for purposes of clarity. The transceivers 54b are disposed in preselected positions such that each of the transceivers 54b is spaced a predetermined distance of about 25 to 150 meters from each of the other transceivers 54b. Upon sensing an alarm condition, the transceivers 54b output a signal indicative of the alarm condition to a guard computer 31b or network administrator to notify security personnel that one of the protected electronic devices 12b is either malfunctioning or is being stolen.

The alarm sensor is provided with a radio frequency modem (not shown) which is configured to communicate with only one of the transceivers 54b. The protected electronic device 12b is disposed near the transceiver 54b which is configured to communicate with the alarm sensor such that communication is established between the alarm sensor and that one transceiver 54b. The alarm sensor automatically outputs a status signal on a periodic basis to the one transceiver 54b via a communication link 56b.

So long as communication is established or maintained between the one transceiver 54b and the alarm sensor (i.e. the alarm sensor is in range of the one transceiver 54b or the alarm sensor is not malfunctioning) then the transceiver 54b does not output a signal indicative of an alarm condition. However, if the communication between the alarm sensor and the one transceiver 54b is interrupted (e.g. the alarm sensor has been moved out of range of the one transceiver 54b, for example), then the transceiver 54b outputs a signal over a communication link 58b indicative of an alarm condition.

The radio frequency modem of the alarm sensor has a predetermined range which is typically between about 50 to 150 meters. Thus, if the protected electronic device 12b is moved away from the one transceiver 54b a distance larger than the predetermined range, the transceiver 54b outputs a signal indicative of an alarm condition.

It should be noted that in one embodiment of the present invention, the transceiver 54b is adapted to output status signals at preselected time intervals to the alarm sensor. If the alarm sensor does not respond within a predetermined time interval by outputting a status signal to the transceiver 54b, the transceiver 54b outputs a signal indicative of an alarm condition to the guard computer 31b.

Because prior art security systems are ineffective to prevent the theft or exchange of components of electronic equipment, the security systems which have been described herein are clearly an improvement over the prior art. One important advantage of the present invention is that it allows a company to selectively authorize people to work in unsupervised office environments without being concerned whether those people will illicitly remove or exchange components of protected electronic devices, such as the protected electronic device 12.

While only one cycle of each process or method disclosed herein has been described in detail, it should be understood that the processes or methods disclosed herein are designed to be repeated for any one of a number of predetermined times so that the security system continuously monitors the protected electronic device 12.

Changes may be made in the steps or the sequence of steps of the methods described herein without departing from the spirit and the scope of the invention as defined in the following claims.

What is claimed is:

1. A method for monitoring equipment comprising the steps of:
    providing an electronic device comprising:
        an enclosure defining an enclosure space;
        a central processing unit disposed within the enclosure space, the central processing unit including a memory and an arithmetic logic unit;
        communication means operably connected to the central processing unit for permitting communication between the central processing unit and a peripheral device;
    disposing an alarm sensor within the enclosure space of the electronic device;
    sensing an alarm condition by the alarm sensor;
    outputting a data signal indicative of the alarm condition in response to the alarm sensor sensing the alarm condition.

2. The method of claim 1 wherein the method further comprises the step of:
    storing the data signal.

3. The method of claim 2 wherein the method further comprises the step of:
    storing a data signal indicative of the time and date coincident of when the alarm sensor sensed the alarm condition.

4. The method of claim 1 wherein the step of outputting the data signal is defined further as:
    outputting the data signal via the communication means; and
    receiving the data signal by a peripheral device located externally of the enclosure.

5. The method of claim 1 wherein in the step of disposing the alarm sensor, the alarm sensor is defined further as being capable of sensing the intensity of light.

6. The method of claim 1 wherein in the step of providing the electronic device, the electronic device is defined further as being a personal computer.

7. The method of claim 6 wherein in the step of providing the electronic device, the communication means is defined further as being connected to the enclosure to provide communication access to peripheral devices disposed externally of the enclosure.

8. A method for monitoring equipment comprising the steps of:
    providing an electronic device comprising:
        an enclosure defining an enclosure space, a portion of the enclosure being selectively movable between an open condition and a closed condition;
        a central processing unit disposed within the enclosure space, the central processing unit including a memory and an arithmetic logic unit;
        communication means operably connected to the central processing unit for permitting communication between the central processing unit and a peripheral device;
    disposing an alarm sensor within the enclosure space of the electronic device;
    moving the portion of the enclosure to the open position;
    sensing the opening of the enclosure by the alarm sensor;
    outputting a data signal indicative of an alarm condition in response to the alarm sensor sensing the opening of the enclosure.

9. The method of claim 8 wherein the method further comprises the step of:
    storing the data signal.

10. The method of claim 9 wherein the method further comprises the step of:
    storing a data signal indicative of the time and date coincident of when the portion of the enclosure was moved to the open position.

11. The method of claim 8 wherein the step of outputting the data signal is defined further as:
    outputting the data signal via the communication means; and
    receiving the data signal by a peripheral device located externally of the enclosure.

12. The method of claim 8 wherein in the step of disposing the alarm sensor, the alarm sensor is defined further as being capable of sensing the intensity of light.

13. The method of claim 8 wherein in the step of providing the electronic device, the electronic device is defined further as being a personal computer.

14. A method for monitoring equipment comprising the steps of:
    providing an electronic device comprising:
        an enclosure defining an enclosure space;
        a central processing unit disposed within the enclosure space, the central processing unit including a memory and an arithmetic logic unit;
        communication means operably connected to the central processing unit for permitting communication between the central processing unit and a peripheral device;
    disconnecting the peripheral device from the communication means; and
    outputting a data signal indicative of an alarm condition.

15. The method of claim 14 wherein the method further comprises the step of:
    storing the data signal.

16. The method of claim 15 wherein the method further comprises the step of:
    storing a data signal indicative of the time and date coincident of when the alarm sensor sensed the alarm condition.

17. The method of claim 14 wherein the step of outputting the data signal is defined further as:
    outputting the data signal via the communication means; and
    receiving the data signal by a peripheral device located externally of the enclosure.

18. A method for monitoring equipment comprising the steps of:
    providing an electronic device comprising:
        an enclosure defining an enclosure space;
        a central processing unit disposed within the enclosure space, the central processing unit including a memory and an arithmetic logic unit;
    connecting the electronic device to an immovable object;
    disconnecting the electronic device from the immovable object; and
    outputting a data signal indicative of an alarm condition.

19. The method of claim 18 wherein the step of connecting the electronic device to the immovable object further comprises the step of:

providing a cable having a first end connected to the electronic device and a second end substantially connected to the immovable object.

20. A method for monitoring equipment, comprising the steps of:

providing a transceiver;

providing an electronic device;

connecting an alarm sensor to the electronic device, the alarm sensor having a radio frequency modem;

establishing electronic communication between the radio frequency modem and the transceiver;

interrupting the electronic communication between the radio frequency modem and the transceiver; and outputting a signal indicative of an alarm condition.

21. The method of claim 20 wherein the radio frequency modem has a predetermined range of between 50 feet to 150 meters.

22. The method of claim 21 wherein the step of interrupting the electronic communication further comprises:

moving the electronic device a predetermined distance away from the transceiver greater than the predetermined range of the radio frequency modem such that the electronic communication between the radio frequency modem and the transceiver is interrupted.

23. The method of claim 20 wherein the step of establishing communication between the radio frequency modem and the transceiver further comprises the step of:

disposing the electronic device near the transceiver such that electronic communication is established between the radio frequency modem and the transceiver.

* * * * *